US009435697B2

(12) United States Patent
Ozaki et al.

(10) Patent No.: US 9,435,697 B2
(45) Date of Patent: Sep. 6, 2016

(54) TEMPERATURE DETECTING CIRCUIT

(71) Applicant: HONDA MOTOR CO., LTD., Tokyo (JP)

(72) Inventors: Hiroyasu Ozaki, Wako (JP); Koichi Takaku, Wako (JP); Taneaki Miura, Wako (JP); Koichi Kato, Wako (JP); Saneto Asano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 500 days.

(21) Appl. No.: 14/076,271

(22) Filed: Nov. 11, 2013

(65) Prior Publication Data

US 2014/0133516 A1   May 15, 2014

(30) Foreign Application Priority Data

Nov. 12, 2012   (JP) .................................. 2012-248373

(51) Int. Cl.
| G01K 7/16 | (2006.01) |
|---|---|
| G01K 7/22 | (2006.01) |
| G01K 7/24 | (2006.01) |
| G01K 15/00 | (2006.01) |

(52) U.S. Cl.
CPC ....................................... G01K 7/22 (2013.01)

(58) Field of Classification Search
CPC ............ G01K 7/16; G01K 7/22; G01K 7/24; G01K 15/00
USPC ........... 374/1, 100, 114, 141, 170, 171, 172, 374/173, 163, 183, 179, 185; 702/99, 130; 327/512, 513
See application file for complete search history.

(56) References Cited

U.S. PATENT DOCUMENTS

| 4,658,120 | A | * | 4/1987 | Fujikawa | G01N 27/122 219/505 |
|---|---|---|---|---|---|
| 5,697,552 | A | * | 12/1997 | McHugh | G05D 23/24 165/270 |
| 5,781,098 | A | * | 7/1998 | Shibata | G01K 7/24 338/195 |
| 6,934,645 | B2 | * | 8/2005 | Kim | G01K 3/005 219/481 |
| 7,607,823 | B2 | * | 10/2009 | Kent | G01M 3/002 374/147 |
| 8,118,487 | B2 | * | 2/2012 | Goh | G01K 3/005 374/114 |
| 8,794,831 | B2 | * | 8/2014 | Coursey | G01K 7/20 374/1 |
| 2002/0123690 | A1 | * | 9/2002 | Fraden | G01J 5/04 600/473 |

FOREIGN PATENT DOCUMENTS

| JP | 05-34208 | 2/1993 |
|---|---|---|
| JP | 3365013 B2 | 7/1995 |

* cited by examiner

*Primary Examiner* — Gail Kaplan Verbitsky
(74) *Attorney, Agent, or Firm* — Mori & Ward, LLP

(57) ABSTRACT

A temperature detecting circuit includes a first thermistor, a second thermistor, a first pull-up resistor, and a second pull-up resistor. The first thermistor has a first positive-side terminal. The second thermistor has a second positive-side terminal. The first thermistor and the second thermistor have different detection sensitivities to temperature. The first pull-up resistor is connected between the first thermistor and a power supply. The second pull-up resistor is connected between the second thermistor and the power supply. The first pull-up resistor and the second pull-up resistor have different resistances. The first pull-up resistor and the second pull-up resistor have such resistances that, in a state where the first positive-side terminal and the second positive-side terminal are short-circuited to each other, the first thermistor detects a temperature as a temperature lower than an actual temperature, and the second thermistor detects a temperature as a temperature higher than an actual temperature.

6 Claims, 5 Drawing Sheets

Ra < Rb AND Ra/(Ra + Rc) < Rb/(Rb + Rd)

$V1 = V2 = Vcc\{Rs/(Rs + Rp)\}$ $Rp = 1/\{(1/Rc) + (1/Rd)\}$ $Rs = 1/\{(1/Ra) + (1/Rb)\}$

| TEMPERATURE [°C] | DETECTED TEMPERATURE [°C] | |
|---|---|---|
| | LOW TEMPERATURE THERMISTOR | HIGH TEMPERATURE THERMISTOR |
| −40 | −37.8 | −53.0 |
| −20 | −14.8 | −33.1 |
| 0 | 3.0 | −14.8 |
| 20 | 25.1 | 3.6 |
| 40 | 44.3 | 22.8 |
| 60 | 65.3 | 39.7 |
| 80 | 86.0 | 58.8 |

| TEMPERATURE [°C] | DETECTED TEMPERATURE [°C] | |
|---|---|---|
| | LOW TEMPERATURE THERMISTOR | HIGH TEMPERATURE THERMISTOR |
| -40 | -52.6 | -24.9 |
| -20 | -31.7 | -3.3 |
| 0 | -15.9 | 19.9 |
| 20 | 4.8 | 42.4 |
| 40 | 20.7 | 65.9 |
| 60 | 38.0 | 88.8 |
| 80 | 58.4 | 103.6 |

TEMPERATURE DETECTING CIRCUIT

CROSS-REFERENCE TO RELATED APPLICATIONS

The present application claims priority under 35 U.S.C. §119 to Japanese Patent Application No. 2012-248373, filed Nov. 12, 2012, entitled "Temperature Detecting Circuit." The contents of this application are incorporated herein by reference in their entirety.

BACKGROUND

1. Field

The present disclosure relates to a temperature detecting circuit.

2. Description of the Related Art

Hydrogen, which is used as a fuel for a fuel cell, is filled into a high pressure gas tank (also simply referred to as tank) for a fuel cell installed in an automobile, in a state in which the hydrogen is compressed to a high pressure of several tens MPa. There are cases in which, when filling the tank with hydrogen as mentioned above, the temperature inside the tank rises abruptly, and when the automobile is running, the hydrogen inside the tank is released from the tank, causing an abrupt drop in temperature. Such temperature rise and temperature drop make it a challenge to keep and control the tank temperature within a range that is determined by a statutory upper limit on the tank temperature, and a lower limit temperature required for maintaining sealability. Accordingly, it is necessary to control the temperature inside the tank to an appropriate temperature. To this end, it is necessary to detect the temperature that fluctuates widely from high to low inside the tank.

A thermistor disclosed in Japanese Unexamined Patent Application Publication No. 5-34208 exists as this type of technique. This thermistor is of a negative temperature coefficient (NTC) type whose resistance decreases with an increase in detected temperature. This thermistor is configured so that two or more thermistor elements that differ in B constant, which indicates the sensitivity of a thermistor with respect to temperature, are connected in parallel to a pair of lead wires. According to this configuration, favorable resistance-temperature characteristics are obtained over a wide temperature range, resulting in wide usage temperature range.

In addition, there is a temperature sensor disclosed in Japanese Patent No. 3365013. In this temperature sensor, two thermistor elements that differ in B constant are electrically connected in parallel, and high-accuracy temperature measurements over a wide temperature range and a specific temperature range are achieved by exploiting the difference in resistance between the thermistor elements on the low temperature side, and the difference in resistance between the thermistor elements on the high temperature side.

SUMMARY

According to one aspect of the present invention, a temperature detecting circuit includes a first thermistor, a second thermistor, a first pull-up resistor, and a second pull-up resistor. The first thermistor has a first positive-side terminal. The second thermistor has a second positive-side terminal. The first thermistor and the second thermistor have different detection sensitivities to temperature. The first pull-up resistor is connected between the first thermistor and a power supply. The second pull-up resistor is connected between the second thermistor and the power supply. The first pull-up resistor and the second pull-up resistor have different resistances. The first pull-up resistor and the second pull-up resistor have such resistances that, in a state where the first positive-side terminal and the second positive-side terminal are short-circuited to each other, the first thermistor detects a temperature as a temperature lower than an actual temperature, and the second thermistor detects a temperature as a temperature higher than an actual temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
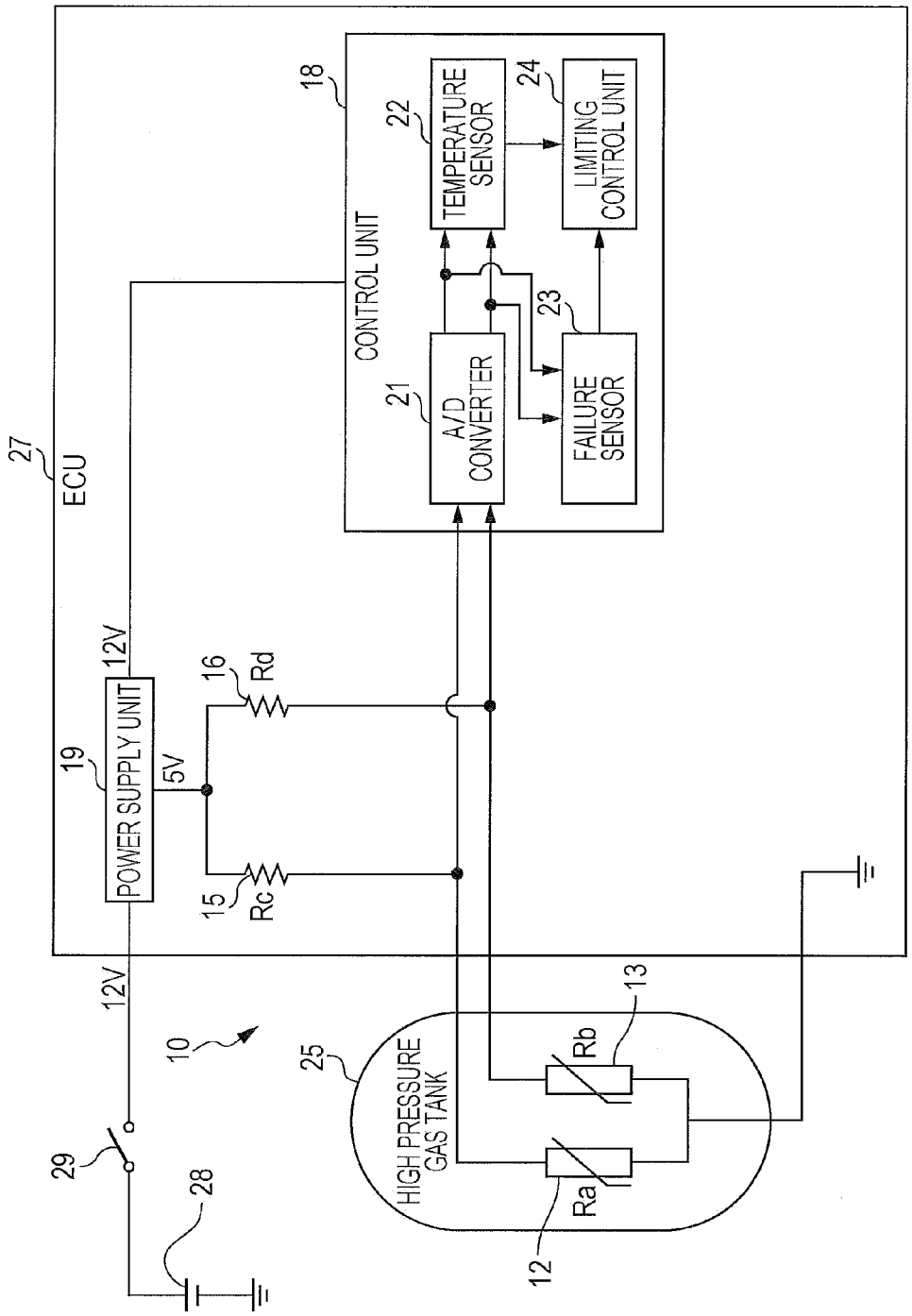
FIG. 1 is a circuit diagram illustrating a configuration of a temperature detecting circuit according to an embodiment of the present disclosure.

The embodiments will now be described with reference to the accompanying drawings, wherein like reference numerals designate corresponding or identical elements throughout the various drawings.

Configuration of Embodiment

FIG. 1 is a circuit diagram illustrating a configuration of a temperature detecting circuit 10 according to an embodiment of the present disclosure. The temperature detecting circuit 10 includes a thermistor 12 used for detecting low temperatures which is grounded at one end, a thermistor 13 for detecting high temperatures which is likewise grounded at one end, a pull-up resistor 15 that is connected between the other end of the thermistor 12 used for detecting low temperatures and a power supply unit 19, a pull-up resistor 16 that is connected between the other end of the thermistor 13 used for detecting high temperatures and the power supply unit 19, and a control unit 18. The control unit 18 has an A/D converter 21, a temperature sensor 22, a failure sensor 23, and a limiting control unit 24. It is to be noted that the thermistors 12 and 13 are NTC thermistors, which are selected so as to differ in B constant from each other.

The thermistor 12 used for detecting low temperatures will be also referred to as low temperature thermistor 12, and the thermistor 13 used for detecting high temperatures will be also referred to as high temperature thermistor 13. The pull-up resistor 15 connected to the low temperature thermistor 12 will be also referred to as low temperature pull-up resistor 15, and the pull-up resistor 16 connected to the high temperature thermistor 13 will be also referred to as high temperature pull-up resistor 16. The control unit 18 includes, for example, a central processing unit (CPU), and a memory such as a read only memory (ROM) or a random access memory (RAM) (none of which is illustrated).

Figure 2A:
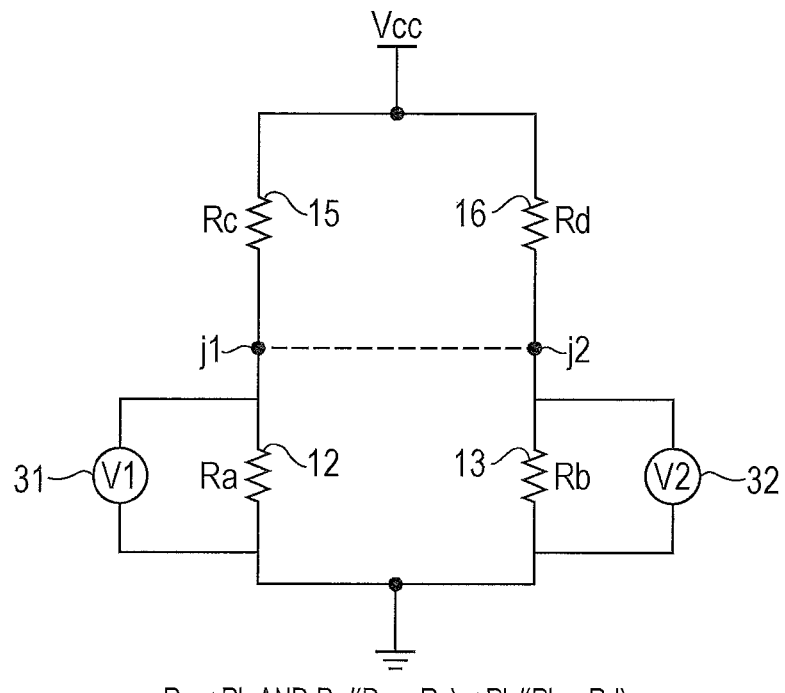
FIG. 2A is a circuit diagram illustrating a configuration of the temperature detecting circuit according to the embodiment.

In the case of a configuration in which, as illustrated in FIG. 2A, the thermistors 12 and 13 and the pull-up resistors 15 and 16 are connected between the output terminal for the voltage Vcc of the power supply unit 19 and the ground, when Ra denotes the resistance of the low temperature thermistor 12, Rb denotes the resistance of the high temperature thermistor 13, Rc denotes the resistance of the low temperature pull-up resistor 15, and Rd denotes the resistance of the high temperature pull-up resistor 16, the magnitude relationship between the resistances Ra to Rd at a given temperature is set so that Ra<Rb and Ra/(Ra+Rc)<Rb/(Rb+Rd).

In the embodiment, the temperature detecting circuit 10 configured as descried above is used for the purpose of detecting the temperature inside a high pressure gas tank (also referred to as tank) 25 used for a fuel cell installed in an automobile. That is, in the embodiment, as illustrated in FIG. 1, the thermistors 12 and 13 are disposed inside the tank 25 used for an automobile, and the pull-up resistors 15 and 16 are disposed in an electronic control unit (ECU) 27 located outside the tank 25 of the automobile. The ECU 27 is installed with the control unit 18, and the power supply unit 19.

The voltage input side of the power supply unit 19 is connected to the positive pole side of an on-board battery (also referred to as battery) 28 via an ignition switch (IGSW) 29, and the voltage output side is connected to each of the pull-up resistors 15 and 16, and the voltage input terminal of the control unit 18. When the IGSW 29 is turned on, the power supply unit 19 steps down (for example, to 5 V) the output voltage of the battery 28 (for example, 12 V), and supplies the resulting voltage to each of the pull-up resistors 15 and 16 and the control unit 18. At the same time, the power supply unit 19 supplies electric power to the control unit 18 without changing the output voltage.

The A/D converter 21 is connected between the low temperature thermistor 12 and the low temperature pull-up resistor 15, and between the high temperature thermistor 13 and the high temperature pull-up resistor 16. The A/D converter 21 converts analog temperature detection signals from the thermistors 12 and 13 into digital signals, and outputs the digital signals to the temperature sensor 22 and the failure sensor 23.

The failure sensor 23 senses a thermistor failure in the following manner. That is, in a case in which a voltage corresponding to the temperature detected by the low temperature thermistor 12, and a voltage value corresponding to the temperature detected by the high temperature thermistor 13, which are outputted as digital signals from the A/D converter 21, become equal, the failure sensor 23 determines that a positive terminal short-circuit failure has occurred in the thermistors 12 and 13. In addition, the failure sensor 23 outputs a signal indicative of the sensing of a failure to the limiting control unit 24. The failure sensor 23 may determine the occurrence of a positive terminal short-circuit failure by directly detecting voltage signals according to the thermistors 12 and 13 on the input side of the A/D converter 21.

In a case in which voltmeters 31 and 32 are connected to opposite ends of the thermistors 12 and 13, respectively, as illustrated in FIG. 2A, during normal operation, a voltage V1 measured by the voltmeter 31, and a voltage V2 measured by the voltmeter 32 differ from each other. This is because the respective resistances Ra and Rc of the thermistor 12 and pull-up resistor 15 on one side, and the respective resistances Rb and Rd of the thermistor 13 and pull-up resistor 16 on the other side differ from each other. That is, the difference is due to the difference between the characteristics of the thermistors 12 and 13.

Figure 2B:
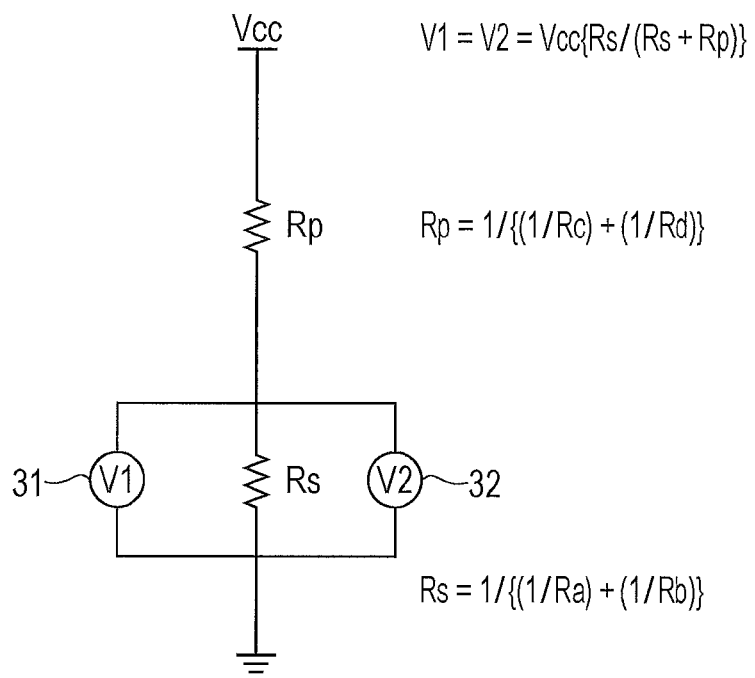
FIG. 2B is an equivalent circuit diagram when a positive terminal short-circuit failure has occurred in each of thermistors of the temperature detecting circuit illustrated in FIG. 2A.

Suppose that a node (positive-side terminal of the thermistor 12) j1 between the thermistor 12 and the pull-up resistor 15, and a node (positive-side terminal of the thermistor 13) j2 between the thermistor 13 and the pull-up resistor 16 are short-circuited to each other (positive terminal short). In this case, as illustrated in FIG. 2B, the respective resistances of the thermistors 12 and 13 are combined to give a resistance Rs, and the respective resistances of the pull-up resistors 15 and 16 are combined to give a resistance Rp. Thus, the resulting circuit configuration is such that a thermistor with the resistance Rs and a pull-up resistor with the resistance Rp are connected in series between the output terminal of the voltage Vcc of the power supply unit 19 and the ground. In this case, the voltage V1 on the voltmeter 31, and the voltage V2 on the voltmeter 32 become equal.

Therefore, the resistance Rs is expressed by Rs=1/{(1/Ra)+(1/Rb)}, and the resistance Rp is expressed as Rp=1/{(1/Rc)+(1/Rd)}. The voltage Vcc of the power supply unit 19 is expressed by V1=V2=Vcc{Rs/(Rs+Rp)}. The temperature sensor 22 converts the temperatures detected by the low temperature and high temperature thermistors 12 and 13, which are outputted from the A/D converter 21 as digital signals, into physical quantities representing these temperatures, and senses the temperatures. While the temperature sensor 22 senses the temperatures detected by the low temperature and high temperature thermistors 12 and 13 in this way, which one of the detected temperatures is to be used is determined in accordance with a predetermined temperature as a threshold.

That is, in a case in which, for example, the temperature inside the tank 25 fluctuates within a range of −50° C. to 90° C., the threshold is set as 0° C., and a sensed temperature according to the low temperature thermistor 12 is used when the mean value of the temperatures detected by the low temperature and high temperature thermistors 12 and 13 is below 0° C., and a sensed temperature according to the high temperature thermistor 13 is used when the mean value is higher than or equal to 0° C.

The limiting control unit 24 executes the following limiting control. That is, when a failure is sensed by the failure sensor 23, the limiting control unit 24 is configured to place a limitation on a predetermined object to be limited (hereinafter, also referred to as target object). Further, the limiting control unit 24 is configured to place a limitation on a predetermined target object by using temperature sensed by the temperature sensor 22. This limiting control is a control executed when placing a limitation so that, for example, the internal temperature of the tank 25 does not exceed a predetermined limit temperature, because the internal temperature should not become neither too high nor too low. In this case, in a case in which, for example, the limit temperature is set as −40° C. on the low temperature side, and set as 80° C. on the high temperature side, when a temperature sensed by the temperature sensor 22 becomes −40° C., the limiting control unit 24 is configured to place a limitation so that the temperature does not become lower than this temperature, and when the sensed temperature becomes 80° C., the limiting control unit 24 is configured to place a limitation so that the temperature does not become higher than this temperature.

The advantage of placing a limitation in this way will be described below. First, consider a typical circuit condition in which the resistances Ra to Rd do not have the magnitude relationship illustrated in FIG. 2A according to the embodiment. That is, consider a case in which the respective resistances Ra to Rd of the thermistors 12 and 13 and pull-up resistors 15 and 16 do not have the relationship expressed by Ra<Rb and Ra/(Ra+Rc)<Rb/(Rb+Rd). For example, consider a typical circuit condition in which a pull-up resistor with a large resistance is connected to the low temperature thermistor 12, and a pull-up resistor with a small resistance is connected to the high temperature thermistor 13.

Figures 3A, 3B:
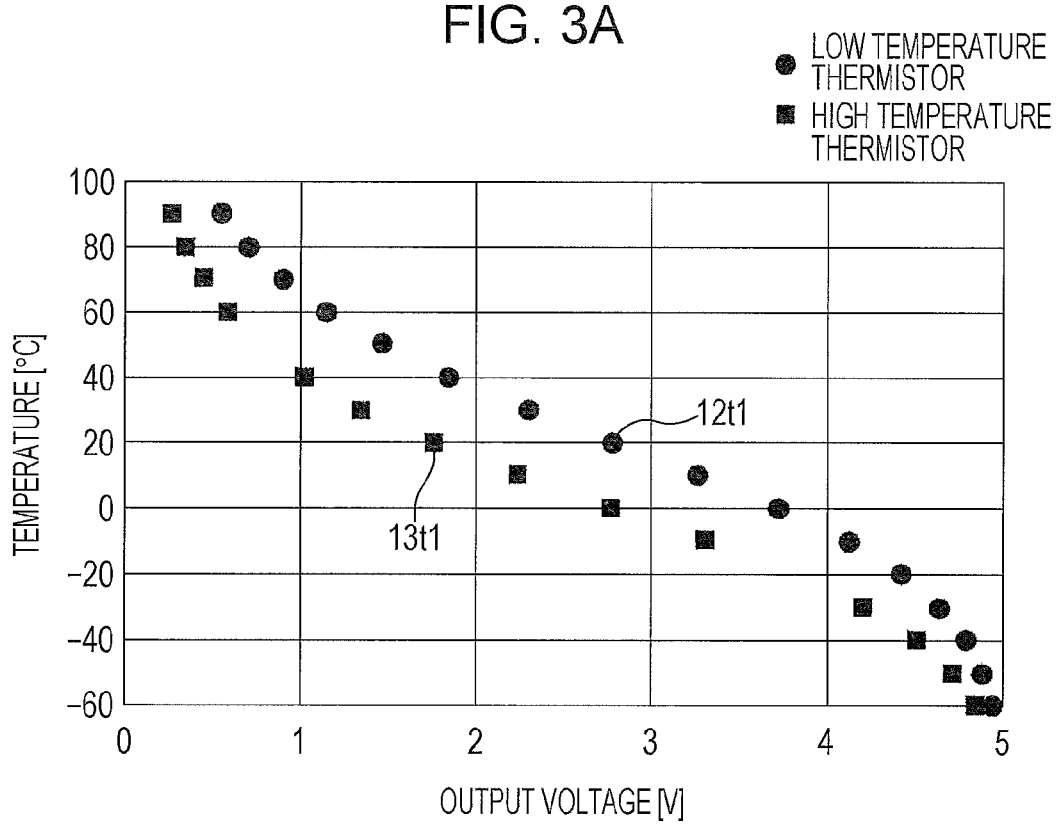
FIG. 3A illustrates graphs each representing the relationship between temperatures to be detected by typical low temperature and high temperature thermistors, and voltages outputted when the temperatures are detected.
FIG. 3B illustrates, by numerical values, the relationship between temperatures to be detected and temperatures detected by the typical low temperature and high temperature thermistors, when the positive-side terminals of these thermistors are short-circuited to each other.

In the case of this typical circuit, as illustrated in FIG. 3A, with the temperature [° C.] to be detected being taken along the vertical axis, and the output voltage [V] corresponding to the temperature detected by a thermistor being taken along the horizontal axis, graphs each representing the relationship between detected temperature and output voltage are indicated by circle marks 12*t*1 and square marks 13*t*1. The circle marks 12*t*1 represent the graph for a low temperature thermistor (denoted by 12*a*), and the square marks 13*t*1 represent the graph for a high temperature thermistor (denoted by 13*a*). Further, FIG. 3B is a table illustrating, by numerical values, the relationship between the actual temperature (true value) [° C.], and the temperatures [° C.] detected by the low temperature thermistor 12*a* and the high temperature thermistor 13*a*, in a case in which a positive terminal short-circuit failure occurs in the low temperature thermistor 12*a* and the high temperature thermistor 13*a* that are typically used as mentioned above.

As can be appreciated from FIG. 3A, even at the same temperature, the output voltage differs between the high temperature thermistor 13*a* and the low temperature thermistor 12*a*. Further, as can be appreciated from FIG. 3B, in a case in which the positive terminals of the thermistors 12*a* and 13*a* are short-circuited to each other, the low temperature thermistor 12*a* detects a temperature of −14.8° C. when the actual temperature is −20° C., and detects a temperature of 44.3° C. when the actual temperature is 40° C., which indicates that both of these temperatures are detected to be higher than the actual temperatures. At this time, the high temperature thermistor 13*a* detects a temperature of −53.0° C. when the actual temperature is −40° C., and detects a temperature of 39.7° C. when the actual temperature is 60° C., which indicates that, conversely, both of these temperatures are detected to be lower than the actual temperatures.

In this way, for low temperatures, temperature is detected to be higher than the actual temperature, and for high temperatures, temperature is detected to be lower than the actual temperature. Therefore, inside the tank 25, a limitation is placed at a temperature lower than the actual temperature on the low temperature side, and a limitation is placed at a temperature higher than the actual temperature on the high temperature side. In this case, the temperature inside the tank 25 becomes too much lower or too much higher than a predetermined limit.

Figures 4A, 4B:
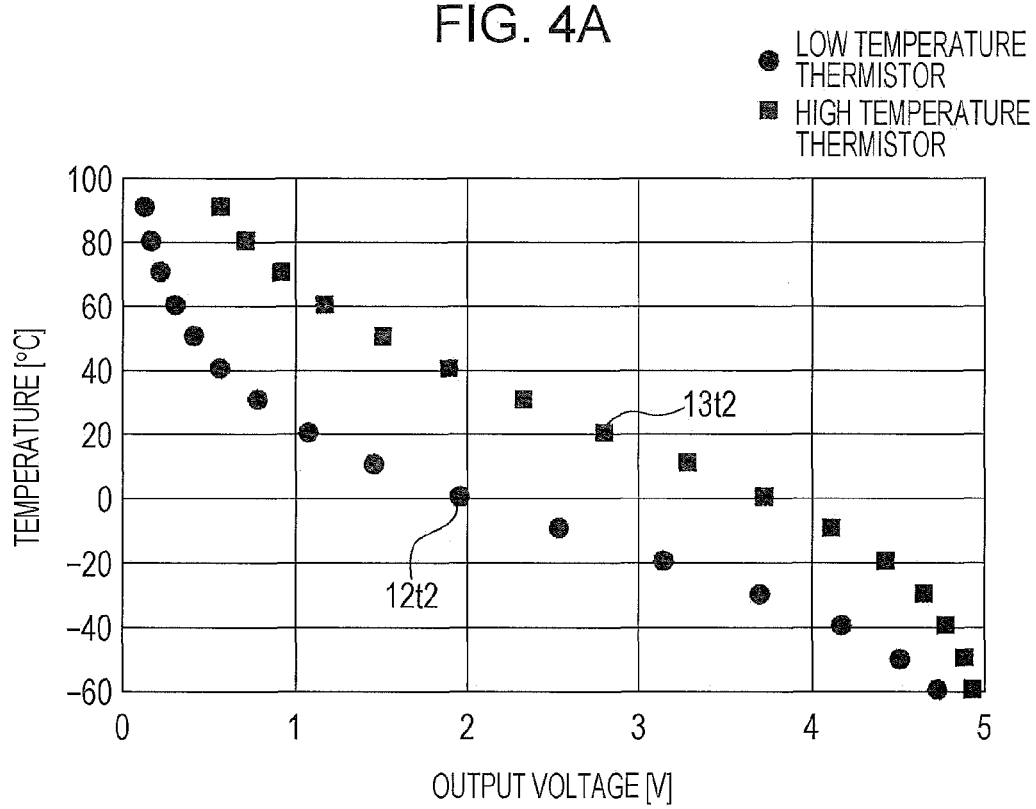
FIG. 4A illustrates graphs each representing the relationship between temperatures to be detected by low temperature and high temperature thermistors according to the embodiment, and voltages outputted when the temperatures are detected.
FIG. 4B illustrates, by numerical values, the relationship between temperatures to be detected and temperatures detected by the low temperature and high temperature thermistors according to the embodiment, when the positive-side terminals of these thermistors are short-circuited to each other.

To the contrary, in the embodiment, as illustrated in FIG. 2A, the respective resistances Ra to Rd of the thermistors 12 and 13 and pull-up resistors 15 and 16 have a magnitude relationship expressed by Ra<Rb and Ra/(Ra+Rc)<Rb/(Rb+Rd). Consequently, the thermistors 12 and 13 tend to detect temperatures as illustrated in FIGS. 4A and 4B. In FIG. 4A, circle marks 12*t*2 indicate the graph for the low temperature thermistor 12, and square marks 13*t*2 indicate the graph for the high temperature thermistor 13.

As illustrated in FIG. 4A, in the circuit according to the embodiment, as in the case of the typical circuit mentioned above, the output voltage differs between the high temperature thermistor 13 and the low temperature thermistor 12 even at the same temperature. Further, as illustrated in FIG. 4B, in a case in which the positive terminals of the thermistors 12 and 13 are short-circuited to each other, the low temperature thermistor 12 detects a temperature of −31.7° C. when the actual temperature is −20° C., and detects a temperature of 20.7° C. when the actual temperature is 40° C., which indicates that both of these temperatures are detected to be lower than the actual temperatures. At this time, the high temperature thermistor 13 detects a temperature of −24.9° C. when the actual temperature is −40° C., and detects a temperature of 88.8° C. when the actual temperature is 60° C., which indicates that, conversely, both of these temperatures are detected to be higher than the actual temperatures.

In this way, for low temperatures, temperature is detected to be lower than the actual temperature, and for high temperatures, temperature is detected to be higher than the actual temperature. Therefore, inside the tank 25, a limitation is placed at a temperature higher than the actual temperature on the low temperature side, and a limitation is placed at a temperature lower than the actual temperature on the high temperature side. In this case, the temperature inside the tank 25 does not become too low or too high relative to a limit.

The temperature inside the tank 25 sensed by the temperature sensor 22 as mentioned above is also used as one of control parameters during communication/filling operation in which the tank 25 is filled with hydrogen while communicating with a hydrogen station (not illustrated). Control parameters include information such as the volume, internal pressure, and internal temperature of the tank 25, and the filling speed of hydrogen to the tank 25.

Operation of Embodiment

Figure 5:
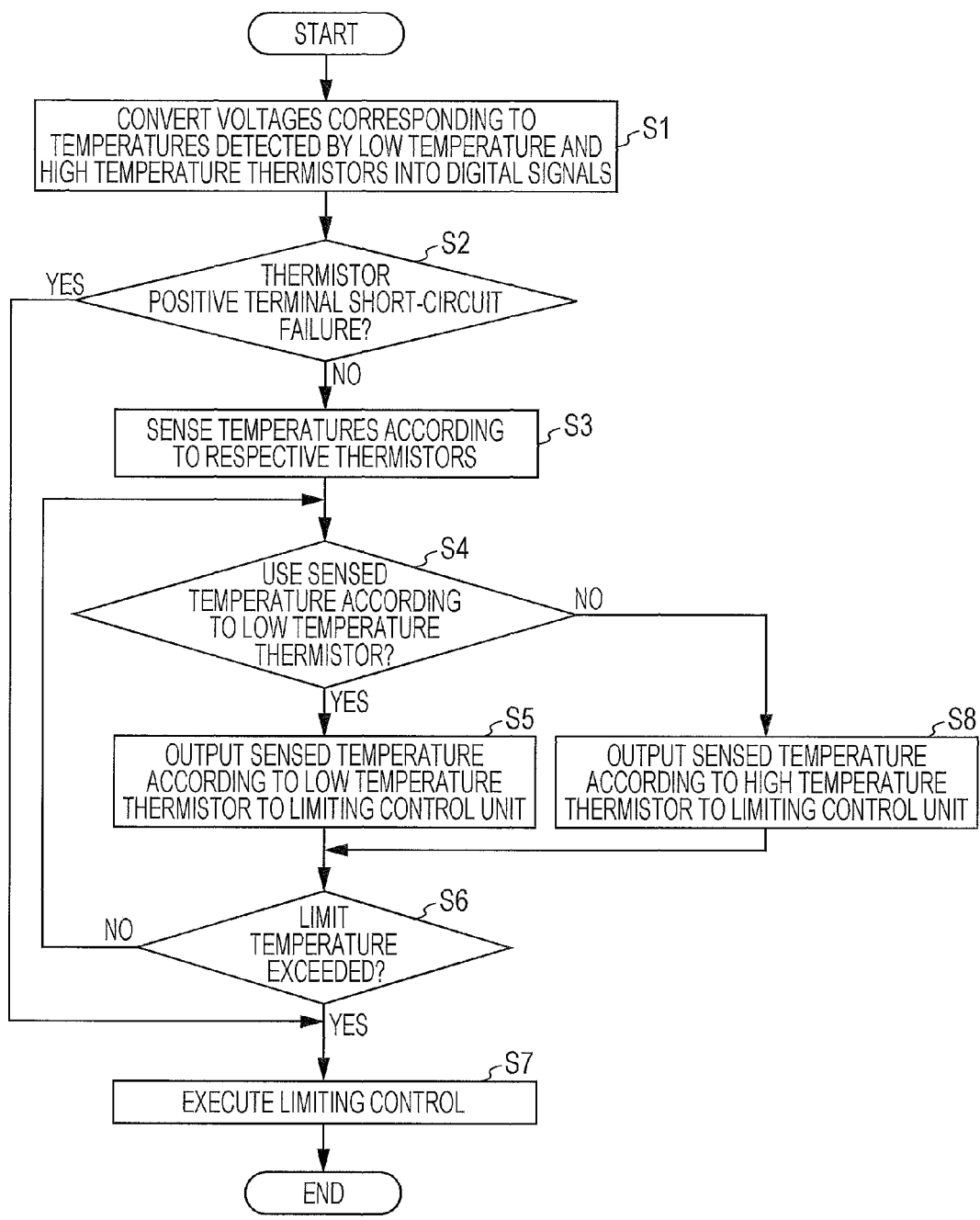
FIG. 5 is a flowchart for explaining a thermistor failure sensing operation, and an operation of limiting the rise or fall of the temperature inside a tank, which are executed by the temperature detecting circuit according to the embodiment.

Next, with reference to the flowchart illustrated in FIG. 5, a description will be given of a thermistor failure sensing operation, and a limiting operation when the temperature inside the tank 25 falls or rises excessively, which are executed by the temperature detecting circuit 10 according to the embodiment. In step S1, analog voltages corresponding to temperatures inside the tank 25 detected by the low temperature and high temperature thermistors 12 and 13 are converted into digital signals in the A/D converter 21, and outputted to the temperature sensor 22 and the failure sensor 23.

In step S2, the failure sensor 23 determines whether or not a positive terminal short-circuit failure of the thermistors 12 and 13 has occurred. At this time, a positive terminal short-circuit failure is determined to have occurred if the digital signals have the same value, and such a failure is determined to have not occurred yet if the digital signals have different values. In a case in which, as a result of this determination, it is determined that a failure has not occurred yet (No), in step S3, temperatures according to the thermistors 12 and 13 are sensed by the temperature sensor 22 from the corresponding digital signals.

On the basis of this sensing, in step S4, it is determined by the temperature sensor 22 whether or not to use a sensed temperature according to the low temperature thermistor 12. That is, the temperature sensor 22 determines to use a sensed temperature according to the low temperature thermistor 12 in a case in which the mean vale of sensed temperatures according to the thermistors 12 and 13 is below a threshold of 0° C., and use a sensed temperature according to the high temperature thermistor 13 in a case in which the mean value is higher than or equal to 0° C.

At this time, in a case in which it is determined to use a sensed temperature according to the low temperature thermistor 12 (Yes), in step S5, a sensed temperature according to the low temperature thermistor 12 is outputted to the limiting control unit 24 from the temperature sensor 22. In step S6, it is determined by the limiting control unit 24 whether or not an inputted sensed temperature exceeds a predetermined limit temperature (in this case, a limit temperature on the low temperature side). For example, when a sensed temperature of, for example, −41° C. is inputted in a case in which the limit temperature on the low temperature side is set to −40° C., it is determined that the inputted temperature exceeds the limit temperature on the low temperature side (Yes).

In this case, in step S7, a limiting control is executed by the limiting control unit 24 so that the temperature inside the tank 25 does not fall below the limit temperature of −40° C. In a case in which, in step S6 mentioned above, a sensed temperature of, for example, −20° C. is inputted, it is determined by the limiting control unit 24 that the inputted temperature does not exceed the limit temperature of −40° C. on the low temperature side (No), and the processing returns to step S4. At this time, again, it is determined by the temperature sensor 22 whether or not to use a sensed temperature according to the low temperature thermistor 12. In a case in which, as a result of this determination, it is determined not to use a sensed temperature according to the low temperature thermistor 12, in other words, it is determined to use a sensed temperature according to the high temperature thermistor 13 (No), in step S8, a sensed temperature according to the high temperature thermistor 12 is outputted to the limiting control unit 24 from the temperature sensor 22, and the processing proceeds to step S6.

In step S6, it is determined by the limiting control unit 24 whether or not an inputted sensed temperature exceeds a predetermined limit temperature (in this case, a limit temperature on the high temperature side). For example, when a sensed temperature of, for example, 60° C. is inputted in a case in which the limit temperature on the high temperature side is set to 80° C., it is determined that the inputted temperature does not exceed the limit temperature of 80° C. on the high temperature side (No), and the processing returns to step S4.

In a case in which, in step S6 mentioned above, a sensed temperature of, for example, −81° C. is inputted, it is determined that the sensed temperature exceeds the limit temperature of 80° C. on the high temperature side (Yes). In this case, in step S7, a limiting control is executed by the limiting control unit 24 so that the temperature inside the tank does not rise above the limit temperature of 80° C. A limiting control is executed in step S7 also in a case in which it is determined in step S2 mentioned above by the failure sensor 23 that a positive terminal short-circuit failure has occurred (Yes).

Incidentally, suppose that in step S2, the failure sensing function of the failure sensor 23 is faulty, and even through the positive terminals of the thermistors 12 and 13 are short-circuited, the short-circuit is not sensed (No). In this case, the positive terminals of the thermistors 12 and 13 are short-circuited, and as described above with reference to FIG. 2B, as a result of the positive terminal short-circuit, the resistances of the thermistors 12 and 13 are combined to give the resistance $Rs=1/\{(1/Ra)+(1/Rb)\}$, and the resistances of the pull-up resistors 15 and 16 are combined to give the resistance $Rp=1/\{(1/Rc)+(1/Rd)\}$. The respective voltages V1 and V2 of the positive terminals of the thermistors 12 and 13 at this time become equal, and further, their relationship with the voltage Vcc of the power supply unit 19 is such that $V1=V2=Vcc\{Rs/(Rs+Rp)\}$.

Consequently, in step S3 that is executed after the result of the determination in step S2 becomes No even through a failure has occurred, a detected temperature according to the combined resistance Rs of the thermistors 12 and 13 is sensed by the temperature sensor 22 from digital signals of the same value. Because this sensed temperature is based on a detected temperature due to the combined resistance Rs, as illustrated in FIG. 4B, the low temperature thermistor 12 tends to detect this temperature to be lower than the actual temperature on the low temperature side, and the high temperature thermistor 13 tends to detect this temperature to be higher than the actual temperature on the high temperature side.

Therefore, it is determined in step S4 that a sensed temperature is below 0° C., and in step S5, the sensed temperature (for example, −41° C.) is outputted to the limiting control unit 24. Then, when it is determined in step S6 that the sensed temperature of −41° C. exceeds a limit temperature (for example, −40° C.) on the low temperature side (Yes), in step S7, a limiting control is executed by the limiting control unit 24 so that the temperature inside the tank 25 does not fall below the limiting temperature of −40° C.

In a case in which it is determined in step S4 that a sensed temperature is higher than or equal to 0° C., in step S5, the sensed temperature (for example, 81° C.) is outputted to the limiting control unit 24. Then, in a case in which it is determined in step S6 that the sensed temperature of 81° C. exceeds a limit temperature (for example, 80° C.) on the high temperature side (Yes), in step S7, a limiting control is executed by the limiting control unit 24 so that the temperature inside the tank 25 does not exceed the limiting temperature of 80° C. Therefore, even in a case in which the failure sensing function of the failure sensor 23 is faulty, a limiting control is executed so that a limitation is placed before the actual temperature inside the tank 25 exceeds an appropriate temperature.

Effects of Embodiment

As described above, the temperature detecting circuit 10 according to the embodiment includes the first and second thermistors 12 and 13 that have different sensitivities to temperature, and the first and second pull-up resistors 15 and 16, the first pull-up resistor 15 being connected between the first thermistor 12 and the power supply unit 19, the second pull-up resistor 16 being connected between the second thermistor 13 and the power supply unit 19, the first and second pull-up resistors 12 and 13 having different resistances Rc and Rd. The first and second pull-up resistors 15 and 16 have such resistances that in a case in which the positive-side terminals of the first and second thermistors 12 and 13 are short-circuited to each other, the first thermistor (for example, the low temperature thermistor 12) detects a temperature lower than the actual temperature, and the second thermistor (for example, the high temperature thermistor 13) detects a temperature higher than the actual temperature.

According to this configuration, temperature is detected to be lower than the actual temperature on the low temperature side, and higher than the actual temperature on the high temperature side. Accordingly, for example, in a case in which a limitation is to be placed on the temperature inside the tank 25 that is a target object in accordance with detected temperature, on the low temperature side, a limitation is placed at a temperature higher than the actual temperature, and on the high temperature side, a limitation is placed at a temperature lower than the actual temperature. Therefore, it is possible to avoid a situation where the temperature inside the tank 25 becomes too much lower or too much higher than a limit, causing malfunction.

Further, when Ra denotes the resistance of the first thermistor 12, Rb denotes the resistance of the second thermistor 13, Rc denotes the resistance of the first pull-up resistor 15, and Rd denotes the resistance of the second pull-up resistor 16, the resistances Ra, Rb, Rc, and Rd have a magnitude relationship expressed by Ra<Rb and Ra/(Ra+Rc)<Rb/(Rb+Rd).

According to this configuration, in a case in which the positive-side terminals of the first and second thermistors 12 and 13 are short-circuited to each other, the first thermistor 12 can detect a temperature lower than the actual temperature, and the second thermistor 13 can detect a temperature higher than the actual temperature. The temperature detecting circuit 10 according to the embodiment further includes the failure sensor 23 that senses that a positive terminal short-circuit failure has occurred in the first and second thermistors, in a case in which voltage signals based on temperatures detected by the first and second thermistors 12 and 13 are equal. According to this configuration, a positive terminal short-circuit failure of the first and second thermistors 12 and 13 can be sensed appropriately.

The temperature detecting circuit 10 according to the embodiment further includes the temperature sensor 22, and the limiting control unit 24. The temperature sensor 22 senses temperature by selecting a voltage signal from the first thermistor 12 in a case in which a temperature corresponding to a voltage signal based on a temperature detected by one of the first and second thermistors 12 and 13 is below a predetermined threshold temperature, and senses temperature by selecting a voltage signal from the second thermistor 13 in a case in which the above-mentioned temperature is higher than or equal to the threshold temperature. The limiting control unit 24 executes a control that places a limitation on the rise or fall of the temperature inside the tank 25, in one of a case in which the temperature sensed by the temperature sensor 22 becomes lower than a predetermined temperature on the low temperature side or exceeds a predetermined temperature on the high temperature side, and a case in which the positive terminal short-circuit failure is sensed by the failure sensor 23.

According to this configuration, an appropriate limitation can be placed on a target object when the failure sensor 23 senses a positive terminal short-circuit failure. Further, for example, even in a case in which the positive terminal short-circuit failure sensing function of the failure sensor 23 is faulty, when a positive terminal short-circuit failure is actually occurring, the first thermistor 12 detects a temperature lower than the actual temperature, and the second thermistor 13 detects a temperature higher than the actual temperature. Consequently, even if the temperature detection voltages according to both the thermistors 12 and 13 become the same owing to the positive terminal short-circuit failure, as for the sensed temperature obtained from each of these voltages, a temperature lower than the actual temperature tends to be detected on the low temperature side below the threshold, and a temperature higher than the actual temperature tends to be detected on the high temperature side higher than or equal to the threshold. Therefore, even for the temperature sensed when a positive terminal short circuit failure occurs, a control can be executed so that a limitation is placed before the actual temperature of the target object exceeds an appropriate range.

The first and second thermistors 12 and 13 are placed inside the tank 25 whose internal temperature fluctuates over a wide range as a fluid is filled into or released from the tank 25. According to this configuration, temperature is actually detected by only two elements, that is, two thermistors 12 and 13 that are typically small in size. Therefore, it is only necessary to dispose the two thermistors 12 and 13 inside the tank 25, which means that even if the tank 25 has a narrow internal space, installation is easy, and problems such as unnecessary restriction on spatial volume may be eliminated.

While the embodiment mentioned above is directed to the case in which the temperature detecting circuit 10 is used for the purpose of detecting the temperature inside the high pressure gas tank 25 used for the fuel cell of an automobile, other than this use, the temperature detecting circuit 10 may be used for a tank used for a ship or stationary fuel cell. Further, the temperature detecting circuit 10 may be used in another container or environment in which the internal temperature fluctuates over a wide range, as in the case of compressed natural gas (CNG) or the like. While there are various types of such containers, the tank 25 is included as one type of such containers.

According to a first aspect of the embodiment, there is provided a temperature detecting circuit including a first thermistor and a second thermistor, the first and second thermistors having different detection sensitivities to temperature, and a first pull-up resistor and a second pull-up resistor, the first pull-up resistor being connected between the first thermistor and a power supply, the second pull-up resistor being connected between the second thermistor and the power supply, the first and second pull-up resistors having different resistances. The first and second pull-up resistors have such resistances that in a case in which positive-side terminals of the first and second thermistors are short-circuited to each other, the first thermistor detects a temperature lower than an actual temperature, and the second thermistor detects a temperature higher than an actual temperature.

According to this configuration of the embodiment, in a case in which the positive-side terminals of these thermistors are short-circuited to each other, temperature is detected to be lower than the actual temperature on the low temperature side, and higher than the actual temperature on the high temperature side. Accordingly, for example, in a case in which some limitation is to be placed on a target object in accordance with detected temperature, on the low temperature side, a limitation is placed at a temperature higher than the actual temperature, and on the high temperature side, a limitation is placed at a temperature lower than the actual temperature. Therefore, it is possible to avoid a situation where the temperature of the target object becomes too much lower or too much higher than a limit, causing malfunction.

According to a second aspect of the embodiment, when Ra denotes a resistance of the first thermistor, Rb denotes a resistance of the second thermistor, Rc denotes a resistance of the first pull-up resistor, and Rd denotes a resistance of the second pull-up resistor, the resistances Ra, Rb, Rc, and Rd have a magnitude relationship expressed by Ra<Rb and Ra/(Ra+Rc)<Rb/(Rb+Rd).

According to this configuration, the first thermistor can be made to detect a temperature lower than the actual temperature, and the second thermistor can be made to detect a temperature higher than the actual temperature.

According to a third aspect of the embodiment, the temperature detecting circuit further includes a failure sensor configured to sense that a positive terminal short-circuit failure has occurred in the first and second thermistors, in a case in which voltage signals based on temperatures detected by the first and second thermistors are equal.

According to this configuration of the embodiment, a positive terminal short-circuit failure of the first and second thermistors can be sensed appropriately.

According to a fourth aspect of the embodiment, the temperature detecting circuit further includes a temperature sensor configured to sense temperature by selecting a voltage signal from the first thermistor in a case in which a temperature corresponding to a voltage signal based on a temperature detected by one of the first and second thermistors is below a threshold temperature that is determined in advance, and sense temperature by selecting a voltage signal from the second thermistor in a case in which the temperature corresponding to the voltage signal is higher than or equal to the threshold temperature, and a limiting control unit configured to place a limitation on an object to be limited, in one of a case in which temperature sensed by the temperature sensor becomes lower than a predetermined temperature on a low temperature side or exceeds a predetermined temperature on a high temperature side, and a case in which the positive terminal short-circuit failure is sensed by the failure sensor.

According to this configuration of the embodiment, an appropriate limitation can be placed on a target object when the failure sensor senses a positive terminal short-circuit failure. Further, for example, even in a case in which the positive terminal short-circuit failure sensing function of the failure sensor is faulty, when a positive terminal short-circuit failure is actually occurring, the first thermistor detects a temperature lower than the actual temperature, and the second thermistor detects a temperature higher than the actual temperature. Consequently, even if the temperature detection voltages according to both the thermistors become the same owing to the positive terminal short-circuit failure, as for the sensed temperature obtained from each of these voltages, a temperature lower than the actual temperature tends to be detected on the low temperature side below the threshold, and a temperature higher than the actual temperature tends to be detected on the high temperature side higher than or equal to the threshold. Therefore, even for the temperature sensed when a positive terminal short circuit failure occurs, a control can be executed so that a limitation is placed before the actual temperature of the target object exceeds an appropriate range.

According to a fifth aspect of the embodiment, the first and second thermistors are placed inside a container whose internal temperature fluctuates over a wide range as a fluid is filled into or released from the container.

According to this configuration of the embodiment, temperature is actually detected by only two elements, that is, two thermistors that are typically small in size. Therefore, as long as the two thermistors are disposed inside the container, even if the container has a narrow internal space, the overall size of a unit including a valve or the like on which to attach these thermistors does not increase, and the unit can be disposed in place without difficulty, or the spatial volume is not unnecessarily restricted.

Obviously, numerous modifications and variations of the present invention are possible in light of the above teachings. It is therefore to be understood that within the scope of the appended claims, the invention may be practiced otherwise than as specifically described herein.

What is claimed is:

1. A temperature detecting circuit comprising:
   a first thermistor having a first positive-side terminal;
   a second thermistor having a second positive-side terminal, the first thermistor and the second thermistor having different detection sensitivities to temperature;
   a first pull-up resistor connected between the first thermistor and a power supply; and
   a second pull-up resistor connected between the second thermistor and the power supply, the first pull-up resistor and the second pull-up resistor having different resistances, the first pull-up resistor and the second pull-up resistor having such resistances that, in a state where the first positive-side terminal and the second positive-side terminal are short-circuited to each other, the first thermistor detects a temperature as a temperature lower than an actual temperature, and the second thermistor detects a temperature as a temperature higher than an actual temperature.

2. The temperature detecting circuit according to claim 1, wherein when Ra denotes a resistance of the first thermistor, Rb denotes a resistance of the second thermistor, Rc denotes a resistance of the first pull-up resistor, and Rd denotes a resistance of the second pull-up resistor, the resistances Ra, Rb, Rc, and Rd have a relationship expressed by Ra<Rb and Ra/(Ra+Rc)<Rb/(Rb+Rd).

3. The temperature detecting circuit according to claim 1, further comprising:
   a failure sensor configured to sense, if voltage signals from the first thermistor and the second thermistor are equal to each other, that a positive terminal short-circuit failure has occurred in the first thermistor and the second thermistor.

4. The temperature detecting circuit according to claim 3, further comprising:
   a temperature sensor configured to sense a temperature based on a voltage signal from the first thermistor if a temperature corresponding to a voltage signal from one of the first thermistor and the second thermistor is below a threshold temperature, the temperature sensor being configured to sense a temperature based on a voltage signal from the second thermistor if a temperature corresponding to a voltage signal from one of the first thermistor and the second thermistor is higher than or equal to the threshold temperature; and a limiting controller configured to place a limitation on an
   object to be limited, in one of
   a case in which a temperature sensed by the temperature sensor becomes lower than a predetermined lower temperature or exceeds a predetermined higher temperature which is higher than the predetermined lower temperature, and
   a case in which the positive terminal short-circuit failure is sensed by the failure sensor.

5. The temperature detecting circuit according to claim 1, wherein the first thermistor and the second thermistor are placed inside a container whose internal temperature fluctuates when fluid is supplied into or released from the container.

6. The temperature detecting circuit according to claim 1, wherein the first pull-up resistor is connected to the first positive-side terminal of the first thermistor, and
   wherein the second pull-up resistor is connected to the second positive-side terminal of the second thermistor.

* * * * *